US007970426B2

(12) United States Patent
Poe et al.

(10) Patent No.: US 7,970,426 B2
(45) Date of Patent: Jun. 28, 2011

(54) METHOD OF ASSIGNING PROVISIONAL IDENTIFICATION TO A SUBSCRIBER UNIT AND GROUP

(75) Inventors: Brian R. Poe, Cary, IL (US); John W. Maher, Woodstock, IL (US); Daniel J. McDonald, Cary, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 472 days.

(21) Appl. No.: 12/207,948

(22) Filed: Sep. 10, 2008

(65) Prior Publication Data

US 2010/0062798 A1    Mar. 11, 2010

(51) Int. Cl.
 *H04B 7/00* (2006.01)
(52) U.S. Cl. ............... 455/519; 455/432.1; 455/521
(58) Field of Classification Search ............... 455/432.1, 455/518–521
See application file for complete search history.

(56) References Cited

U.S. PATENT DOCUMENTS

| 2002/0115438 A1 | 8/2002 | D'Herebemont et al. |
| 2003/0050097 A1 | 3/2003 | Amirijoo et al. |
| 2006/0046724 A1 | 3/2006 | Ton et al. |
| 2008/0130585 A1 | 6/2008 | Park et al. |
| 2008/0188220 A1 | 8/2008 | DiGirolamo et al. |

OTHER PUBLICATIONS

PCT International Search Report Dated Mar. 31, 2010.

*Primary Examiner* — Raymond S Dean
(74) *Attorney, Agent, or Firm* — Terri S. Hughes

(57) ABSTRACT

The present disclosure provides an efficient and effective method for allocating provisional PUIDs and PGIDs to subscriber units and groups during a failure, such that when the communication system recovers, there is a decrease in or elimination of the number of dropped or missed communications. The present disclosure reserves a range of provisional PUIDs and PGIDs for resource controllers operating in a region of system failure to assign when subscriber units roam into the region of failure in the communication system. The present disclosure addresses creating PUID and PGID ranges for resource controllers to assign to roaming subscriber units in order to allow for assignment of PUIDs and PGIDs during periods of subsystem isolation and site trunking, i.e., when the particular site or subsystem cannot communicate with the rest of the communication system. The present disclosure also addresses recovering from these situations, re-registration, and reallocation of PUIDs and PGIDs.

18 Claims, 4 Drawing Sheets

FIG. 2A

| Provisional Unit Identification | Subscriber Unit/ Communication System Operating State |
|---|---|
| 0-15,999,999 | Native Subscriber Units/Normal and Failure Operating State |
| 16,000,000-16,500,000 | Roaming Subscriber Units/Normal Operating State |
| 16,500,001-16,750,000 | Roaming Subscriber Units/Failure Operating State - Subsystem Isolation |
| 16,750,001-16,777,200 | Roaming Subscriber Unit/Failure Operating State - Site Trunking |

FIG. 2B

| Provisional Group Identification | Subscriber Group/ Communication System Operating State |
|---|---|
| 0-63,999 | Native Subscriber Groups/Non-failure and Failure Operating State |
| 64,000-65,000 | Non-native Subscriber Group/Normal Operating State |
| 65,001-65,300 | Non-native Subscriber Group/Failure Operating State - Subsystem Isolation |
| 65,301-65,533 | Non-native Subscriber Group/Failure Operating State - Site Trunking |

METHOD OF ASSIGNING PROVISIONAL IDENTIFICATION TO A SUBSCRIBER UNIT AND GROUP

TECHNICAL FIELD OF THE DISCLOSURE

This disclosure relates generally to communication systems, and more particularly, the present disclosure pertains to a method of assigning a provisional unit identification (provisional group identification) to a subscriber unit (subscriber group) during communication system failures.

BACKGROUND OF THE DISCLOSURE

Public and private safety communications using land mobile radio services have been growing at a steady rate. As such, it is becoming increasingly important for organizations and their respective communication systems to interoperate with one another. Interoperability between organizations includes the ability of a first organization's communication network and/or system to support a second (foreign) organization's subscriber units when subscriber units from the second organization roam into the first organization's communication network and/or system. In other words, it is important for subscriber units to have the ability to travel away from their home coverage system and into the coverage region of a foreign communication system, request services from the foreign communication system, and acquire such services.

While subscriber units currently are able to efficiently receive and use resources from foreign communication systems during normal or non-failure situations, often subscriber units, physically located in, but foreign to, a communication system ("roaming subscriber units") miss or drop communications when a site or subsystem within the foreign communication system is in a failure mode, such as site trunking or subsystem isolation, respectively.

Without physically roaming into another communication system, subscriber units may also affiliate with subscriber groups from different systems. Subscriber units from one system may participate in the foreign system's subscriber group (i.e., a "non-native subscriber group") efficiently during normal or non-failure situations, even though the subscriber unit is physically located in a different system. However, when the site or subsystem in which the subscriber unit is physically located experiences a failure, such as site trunking or subsystem isolation, the subscriber units affiliated with the non-native subscriber group may miss or drop communications.

One reason for missed and dropped communications is because of the lack of a comprehensive and effective method in which the subscriber unit is identified and allocated resources by the communication system during and after the communication system failure. Currently, there is no effective method to identify roaming subscriber units and assign provisional unit identification to roaming subscriber units during, or in the event of, a communication system failure. Similarly, there is no effective method for identifying and assigning provisional group identifications for non-native subscriber groups during, or in the event of, a communication system failure. In addition, there is no method to effectively request that the roaming subscriber units or non-native subscriber groups re-register with the communication system when the failure situation no longer applies, without the roaming subscriber unit or the subscriber unit affiliated with the non-native subscriber group missing or dropping communications.

BRIEF DESCRIPTION OF THE FIGURES

The benefits and advantages of the present disclosure will become more readily apparent to those of ordinary skill in the relevant art after reviewing the following detailed description and accompanying drawings, wherein:

FIG. 2A is an exemplary block diagram of a distribution of provisional unit identification numbers in accordance with an embodiment of the present disclosure;

FIG. 2B is an exemplary block diagram of a distribution of provisional group identification numbers in accordance with an embodiment of the present disclosure;

Figure 1:
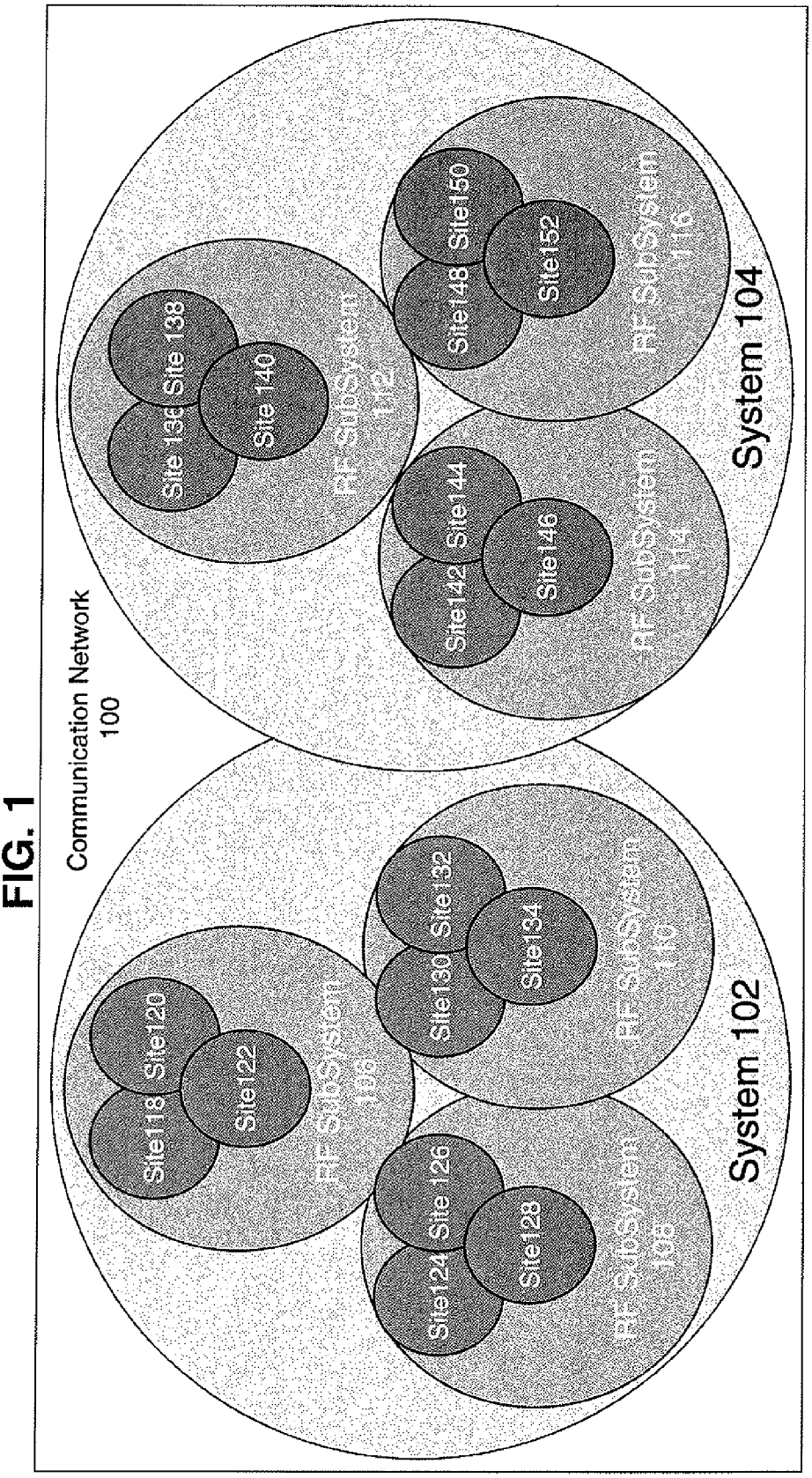
FIG. 1 is an exemplary diagram of a wireless communication system in accordance with an embodiment of the present disclosure.

Skilled artisans will appreciate that elements in the figures are illustrated for simplicity and clarity and have not necessarily been drawn to scale. Also, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions with respect to their corresponding respective regions of inquiry and study except where specific meaning have otherwise been set forth herein.

DETAILED DESCRIPTION OF THE DISCLOSURE

The present disclosure provides a method for assigning pre-determined, temporary, a provisional unit identification (PUID) to a subscriber unit, and a pre-determined temporary provisional group identification (PGID) to a subscriber group. The present disclosure decreases or eliminates the number of dropped or missed communications by a subscriber unit affected by a communication system failure. The present disclosure reserves a first predetermined range of PUIDs for the resource controllers operating under normal circumstances to assign to roaming subscriber units which roam into or power up in a region of the communication system controlled by the resource controller. The present disclosure also reserves a second predetermined range of PUIDs for the resource controllers operating in a region of failure or isolation from the rest of the system to assign when roaming subscriber units roam into or power-up in a region of the communication system controlled by the resource controller. In other words, when the resource controller in a particular subsystem or site cannot communicate with the rest of the communication system due to, for example, subsystem isolation or site trunking. Similarly, the present disclosure also creates temporary PGIDs and reserves a first pre-determined range of PGIDs for the resource controllers operating under normal circumstances to assign to subscriber groups which are non-native to a communication system. The present disclosure also reserves a second pre-determined range of PGIDs for the resource controllers operating in a region of failure or isolation from the rest of the system to assign when subscriber units affiliate with a non-native subscriber group in a region of the communication system controlled by a resource controller. Alternatively, the present disclosure may create sub-ranges within a reserved, pre-determine PUID/PGID range for resource controllers to assign to roaming subscriber units/subscriber groups. Reserving the first and second pre-determined ranges of PUIDs and PGIDs, or creating predetermined sub-ranges within a reserved range of PUIDs and PGIDs, allows for resource controllers in sites and subsystems outside of the failure region to recognize that a failure has or had occurred, to recognize which type of failure had occurred, and to recognize which subscriber units were involved so that the subscriber units involved can re-register with the affected system efficiently and effectively while not missing any calls or communications. The present disclosure also addresses issues involved with recovering from the failure situations, re-registration, and re-assignment of PUIDs and PGIDs to subscriber units and subscriber groups.

Wireless communications networks support wireless or air interface protocols for signaling transmissions. An exemplary wireless communication network ("communication network") is described herein. A communication network is composed of similarly configured communications systems. A communication system is composed of at least one radio frequency ("RF") subsystem which supports a set of services across a defined coverage region. A RF subsystem is uniquely identified by its communication network identification (ID), its communication system ID, and its RF subsystem ID. Wireless communications are transmitted over wireless channels. Typically, at each site in a RF subsystem, at least one channel is used as a control channel for signaling and broadcasting of communication system information, while other traffic channels are used for transmitting digitized voice and packetized data. Resource controllers within the systems, subsystems, and sites control and monitor the channels and allocate resources among the various subscriber units, as needed. One such communication system is the Project 25 system, defined by the Telecommunications Industry Association, TIA-102 publications. For simplicity, the present disclosure utilizes the P25 system as an example of a structured, wireless communication system, but it is to be understood that the present disclosure encompasses all communications systems compatible with the present disclosure and is not intended to limit the disclosure to the P25 system. Those skilled in the art will recognize and appreciate that the specifics of this illustrative example are not specifics of the disclosure itself and that the teachings set forth herein are applicable in a variety of settings.

Subscriber units typically have a subscriber unit identification (SUID) composed of a string of digital bits. It should be noted that subscriber units are also referred to in the art as mobile stations, handsets, communications devices and the like, and includes, but is not limited to mobile radios, portable radios, cellular radios or telephones, video terminals, portable computers with wireless modems, personal digital assistants or any other type of wireless communications device. In a subscriber unit's SUID, the most significant bits typically indicate and correspond to the subscriber unit's "home" or "native" communication network and its home or native communication system. The least significant bits generally correspond to the individual subscriber unit's unit identification (UID). Subscriber units sharing a common "home" generally have the same communication network and system ID bits in their SUIDs. A subscriber unit having communication network and/or system ID bits which do not correspond with the communication network and/or system in which the subscriber unit is physically located is considered a "foreign" or "roaming" subscriber unit in that "foreign" communication network and/or system. Roaming refers to the ability of a subscriber unit to request and obtain resources from the communication system in which it roams. A "roaming subscriber unit" is one which is not native to the system in which it is currently operating, whereas a "native subscriber unit" is native to the system in which it is currently operating. Communication systems typically have subscriber groups that also have a subscriber group identification (SGID). In a subscriber group's SGID, the most significant bits typically indicate and correspond to the subscriber group's "home" or "native" communication network and its home or native communication system. The least significant bits generally correspond to the subscriber group's group identification (GID). Subscriber groups sharing a common "home" generally have the same communication network and system ID bits in its SGID. A subscriber group having communication network and/or system ID bits which do not correspond with the communication network and/or system in which the subscriber unit that is affiliated with the group is physically located is considered a "non-native" or "foreign" subscriber group in that communication network and/or system. The present disclosure discusses allocating PUIDs to roaming subscriber units first, followed by allocating PGIDs to non-native subscriber groups.

At times, a subscriber unit roams into a site or subsystem of a foreign communication network or communication system to which it is not native. While roaming, the roaming subscriber unit communicates with other subscriber units from the roaming subscriber unit's home system, which are similarly registered and physically located in the foreign system, using the foreign system's resources. The roaming subscriber unit is also able to communicate with the subscriber units of the foreign communication system in which the roaming subscriber unit roams as well as the subscriber units physically located in the roaming subscriber unit's home system. In each situation, the roaming subscriber unit must register with the foreign site or subsystem in which it roams in order to be able to use the foreign system's resources. Registration is necessary to provide a means of restricting service access to only valid native and roaming subscriber units and to provide a method to record the site where the native and roaming subscriber unit is located within the communication system.

When roaming, a subscriber unit generally registers its SUID with a resource controller within a system's RF subsystem. Typically, two types of registration are available: unit registration and location registration. During unit registration, the communication system checks the validity of the subscriber unit and also assigns a temporary PUID to the roaming subscriber unit for use within the communication system. The PUID is a unique short ID given to a subscriber unit to save bandwidth on future transactions. For native subscriber units, the PUID is generally the UID of the SUID. Since each subscriber unit must be assigned a unique SUID, this method ensures that each PUID assigned to a native subscriber unit is also unique. When the subscriber unit, native or roaming, moves to another site within the communication system in which it has been assigned a PUID, the native or roaming subscriber unit informs the communication system of the site location change by location registration. Another unit registration within the same system is usually unnecessary if the communication system is operating without failures. Having native and roaming subscriber units perform a location registration to register their PUIDs with the site/subsystem allows the subsystem to support and allocate resources to each of the subscriber units operating within the subsystem efficiently and quickly. After performing a location registration in the subsystem, the native and roaming subscriber units are able to request the use of the communication system's resources.

Under normal operating conditions, in order for a subscriber unit, either native or roaming, to register its SUID with a communication system via a site within an RF subsystem, the subscriber unit generates a unit registration request, for example, as part of a full registration procedure. When assigning a PUID during unit registration for a native subscriber unit operating in its native system, the communication system uses the native subscriber unit's UID as the PUID. By limiting the assignment of the unit ID portion of all native subscriber unit's SUIDs to a specific range from the total unit ID space, for example, to a number between 0 to 15,999,999, the native subscriber units may be permanently assigned their unit ID as their PUID. When assigning a PUID to a roaming subscriber unit, however, the PUID is chosen from a specific range of the total unit ID space which has not been assigned as the unit ID to any native subscriber unit, i.e., not within the range of 0 to 15,999,999. Under normal operating conditions, the unit registration process is efficient and effective. The communication system is aware of all subscriber units, native and roaming, operating within its boundaries and can assign unique PUIDs to, and allocate resources among, all the subscriber units efficiently. This enables subscriber units to roam throughout the communication system using a location registration at a new site with only the PUID to identify the subscriber, since the communication system is aware of the relationship of the PUID to a subscriber's SUID.

Under failure conditions, however, the RF subsystems are not able to communicate the unit registrations of roaming subscriber units during the failure to the entire communication system. These failure conditions include site trunking and subsystem or zone isolation. Resources may be allocated by a resource controller inside the failure region during the failure. Similarly, resources may be allocated to subscriber units outside the failure region by another resource controller outside of the region during a failure. The resource controller in the failure region and the resource controllers in the non-failure regions, however, are not able to communicate, nor are any resource controllers in two or more regions in failure mode able to communicate during the failures, to identify how resources are being allocated to roaming subscriber units. In particular, the resource controllers are not able to communicate with each other which PUIDs were assigned to the roaming subscriber units during the failure, leading to the potential for duplicate PUIDs to be assigned to roaming subscriber units within the same communication system. Therefore, when the region(s), such as the site or RF subsystem, recovers from the failure, there is a period of time in which communications for the roaming subscriber units may be missed or dropped because of duplicate PUIDs (i.e., two non-native subscriber units are assigned the same temporary PUID).

To prevent missing or dropping communications, a first range of PUIDs is designated for resource controllers to assign when roaming subscriber units perform unit registration with the communication system when operating under normal circumstances. In addition, a second range of PUIDs is designated for resource controllers to assign to roaming subscriber units in order to allow for assignment of PUIDs during periods of failure, such as subsystem isolation and site trunking, i.e., when the particular site or subsystem cannot communicate with the rest of the communication system. A PUID allocated from the second range is an indication to any resource controller in the communication system that this PUID may not be unique. Alternatively, sub-ranges are created within the designated PUID range for resource controllers to assign to roaming subscriber units in order to allow for assignment of PUIDs during periods of failure, such as subsystem isolation and site trunking.

Figure 3:
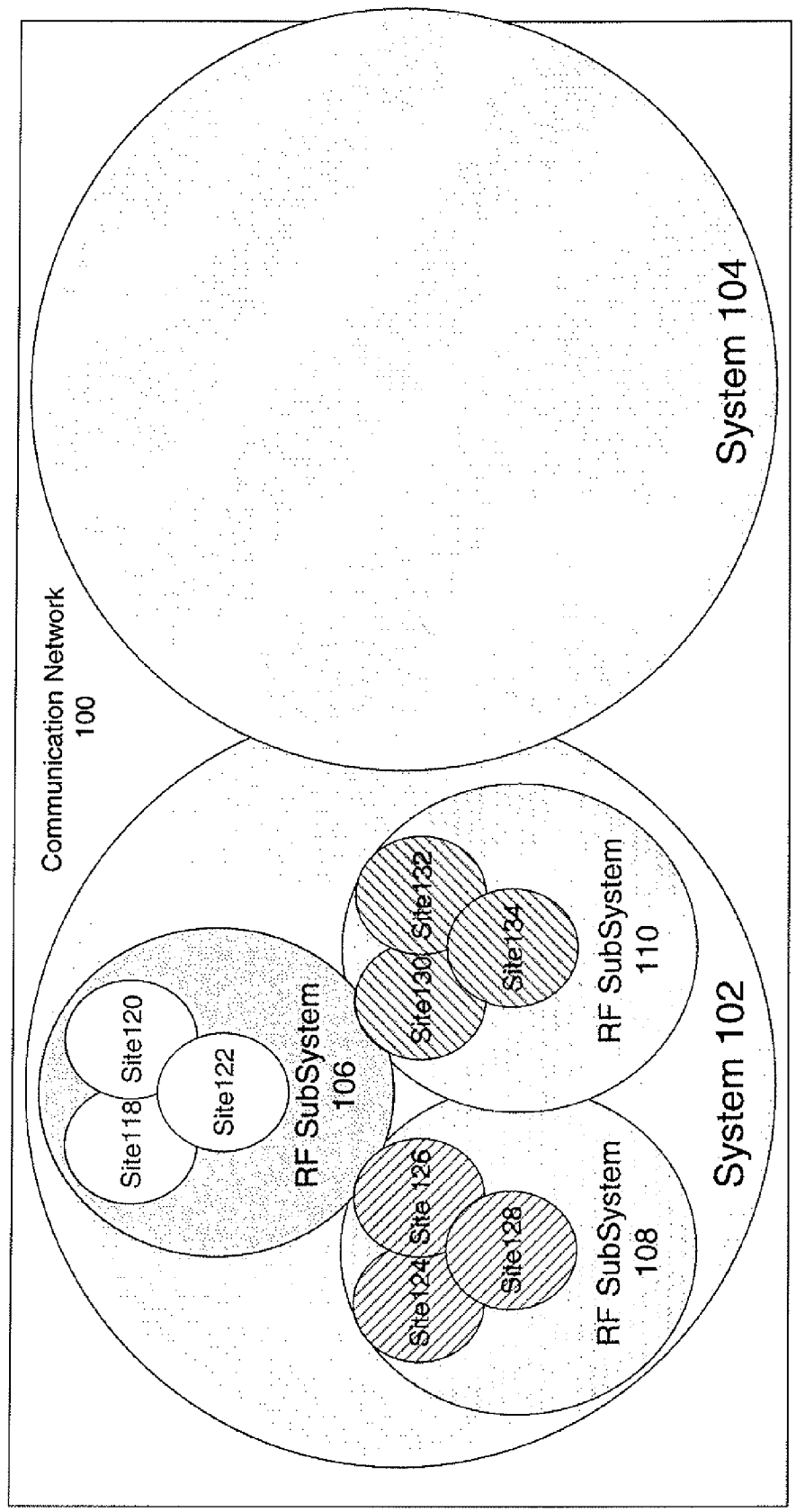
FIG. 3 is an exemplary diagram of a subsystem in subsystem isolation in accordance with an embodiment of the present disclosure.
Figure 4:
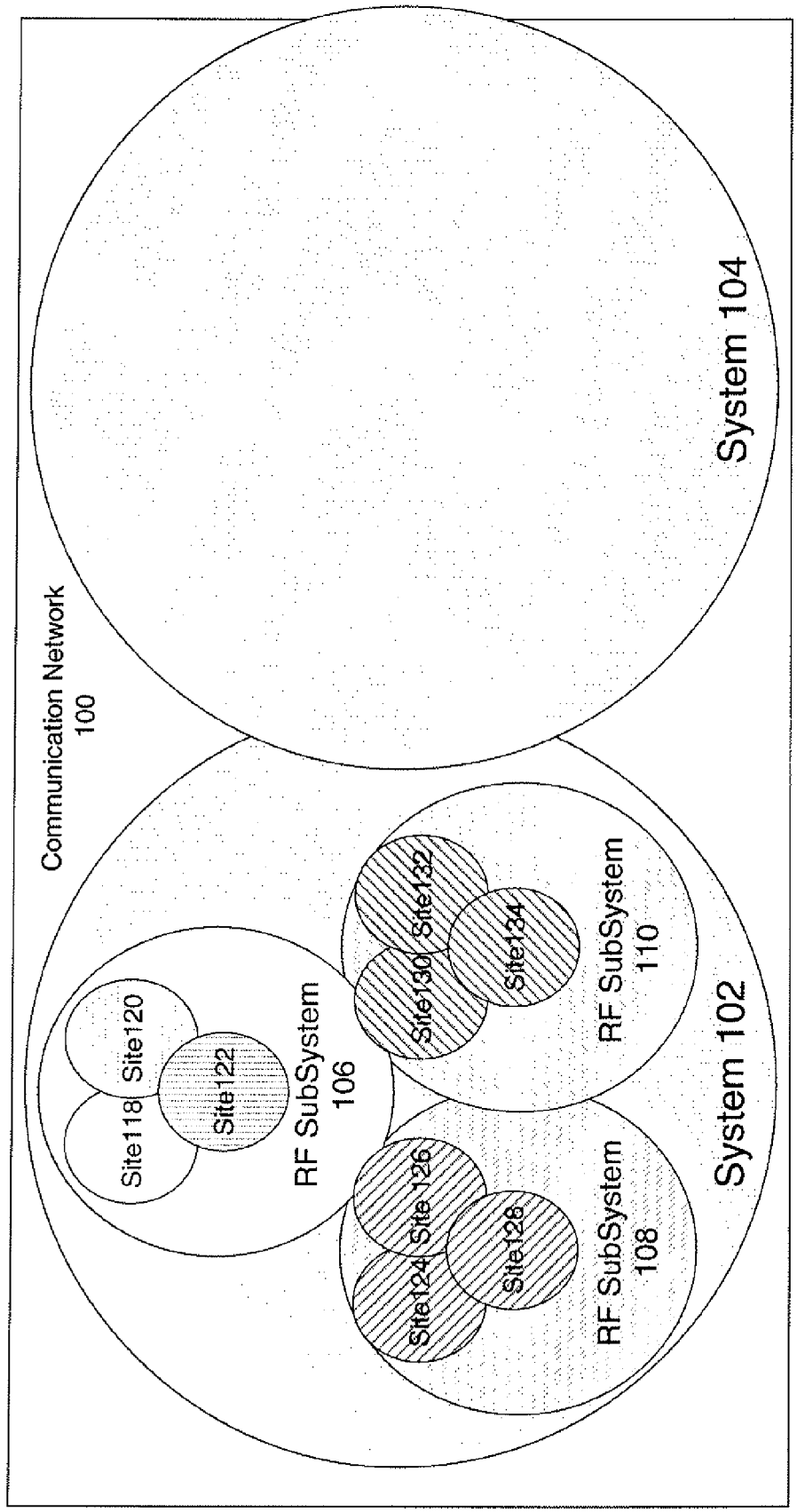
FIG. 4 is an exemplary diagram of a site in site trunking in accordance with an embodiment of the present disclosure.

FIG. 1 illustrates an exemplary embodiment of a communication network of the present disclosure. A communication network 100 is shown having two communication systems, system 102 and system 104, operating in the communication network 100. Each system 102, 104 has multiple RF subsystems operating within it. System 102 has RF subsystems 106, 108, 110 operating within system 102. System 104 has RF subsystems 112, 114, and 116 operating in system 104. RF subsystem 106 has three sites operating in it, sites 118, 120, and 122. Similarly, RF subsystem 108 has multiple sites 124, 126, 128 and RF subsystem 110 has sites 130, 132, 134, operating in it. System 104 is similarly organized into RF subsystems 112, 114, and 116 having respective sites 136, 138, 140, 142, 144, 146, 148, 150, and 152. Failure conditions of subsystem isolation and site trunking are illustrated in FIGS. 3 and 4. In subsystem isolation, as shown in FIG. 3, the RF sub-system 106 is isolated from other sub-systems in the communication system and/or communication network. Sites 118, 120 and 122 are able to communicate with RF subsystem 106, but not with other sites outside of RF subsystem 106. Similarly, in site trunking, as shown in FIG. 4, the site 118 is isolated from and cannot communicate with any other sites and sub-systems in the communication network.

A subscriber unit native to, for example, system 102 is operating in its native system when registered at site 134 of RF subsystem 110 or any of the sites 118, 120, 122, 124, 126, 128, 130, and 132 within system 102. The native subscriber units in system 102 have the same corresponding communication network 100 and system 102 bits in their SUIDs. The same subscriber unit native to system 102 would be a roaming or foreign subscriber unit in system 104 and its corresponding RF subsystems 112, 114, and 116. The SUIDs of the subscriber units native to system 104 have the same communication network bits as those subscriber units of system 102, but the communication system 104 bits of the SUIDs are different, to differentiate the subscriber units native to system 104 from those that are roaming.

In order to receive wireless communication services from, for example, system 102, into which a roaming subscriber unit has roamed, the roaming subscriber unit registers its SUID by performing a unit registration with the resource controller of the region, in one example, RF subsystem 106. In steady state or normal operating mode, the roaming subscriber unit is assigned a PUID and/or a PGID by the resource controller for RF subsystem 106 while roaming in RF subsystem 106. The PUID assigned is also valid in RF subsystems 108 and 110, provided that the subsystems 106, 108, and 110 are in normal operating mode and all the call elements necessary for communications are intact. If the communication system is in normal operating mode, the resource controller of RF subsystem 106 can relay all the necessary information to the communication system 102 such that any sites or subsystem within the communication system 102 are aware of the relationship of the PUID to a roaming subscriber's SUID and the relationship of the PGID to a non-native subscriber group's SGID. Relaying the information not only allows the roaming subscriber unit to use the communication system resources, but it also ensures that the PUID is unique to each of the subscriber units operating in the communication system 102 and that the PGID is unique to each of the subscriber groups operating in the communication system 102.

FIG. 2A shows an approach to partition the range of PUIDs during failure and non-failure conditions. The approach illustrated permanently assigns PUIDs for native subscriber units to the unit ID portion of the native subscriber unit's SUID during all conditions, failure and non-failure. The approach restricts the UIDs that can be assigned to native subscriber units to the range of 0-15,999,999. For example, when a native subscriber unit registers its SUID on system 102 (its home) during unit registration, with a SUID composed of a communication network ID of 100, a system ID of 102 and a unit ID of 50, it is assigned a PUID of 50. Those skilled in the art will recognize and appreciate that the specifics of this illustrative example are not specifics of the disclosure itself and that the teachings set forth herein are applicable in a variety of alternative settings. In addition, it is understood to those skilled in the art that the IDs are composed of digital bits and for simplicity have been converted to corresponding Arabic numbers in the present disclosure.

In contrast, the approach in FIGS. 1 and 2A restricts PUIDs assigned to roaming subscriber units to the range of 16,000,000-16,777,200. An embodiment of the present disclosure restricts PUIDs assigned to roaming subscriber units operating in any non-failure condition to 16,000,000-16,500,000 and operating in any failure condition to 16,500,001-16,777,200. Unlike a native subscriber unit in which the PUID assigned is permanent, the PUID assigned to a roaming subscriber unit is temporary. A roaming subscriber unit may be assigned a new temporary PUID from the isolation range each time it roams into the foreign system, while the native subscriber units retain their permanent PUIDs.

In a non-failure condition, when a roaming subscriber unit registers its SUID on system 102, with an SUID composed of a communication network ID of 100, a system ID of 104 and a unit ID of 50, if there are no infrastructure failures, then the resource controller assigns the roaming subscriber unit a PUID, for example, of 16,000,001. The PUID is valid provided that the roaming subscriber unit remains in the communication system 102. For example, in an exemplary communication system, PUIDs are only valid within the same system ID. It should be noted that the numbering classifications in the present disclosure are for illustration and explanation purposes only. The present disclosure should be understood to incorporate and encompass all the possible ID arrangements and schemes compatible with the present disclosure. Again, those skilled in the art will recognize and appreciate that the specifics of this illustrative example are not specifics of the disclosure itself and that the teachings set forth herein are applicable in a variety of alternative settings. The non-failure classification of PUIDs works well and ensures that all PUIDs are unique in system 102 when the system 102 is fully operational, as all PUIDs in the entire system need to be unique.

When the communication system is not in its normal operating mode, it is important that the PUIDs assigned to the roaming subscriber units are unique at least within the region of failure. For example, in a region of site trunking, all identifications must be unique at that site, but not necessarily across other RF sites. In subsystem isolation, as shown in FIG. 3, the RF subsystem 106 is isolated from other subsystems in the communication system and/or communication network. Sites 118, 120 and 122 are able to communicate with RF subsystem 106, but not with other sites outside of RF subsystem 106. Similarly, in site trunking, as shown in FIG. 4, the site 118 is isolated from and cannot communicate with any other sites and subsystems in the communication network.

Therefore, in the present disclosure, during a failure, the resource controller assigns PUIDs to roaming subscriber units from one of two PUID ranges. During the failure of subsystem isolation, the resource controller in the isolated subsystem assigns PUIDs from 16,500,001-16,750,000 to roaming subscriber units. During the failure situation of site trunking, the resource controller at the site with the failure assigns PUIDs from the range of 16,750,001-16,777,200 to roaming subscriber units. Subdividing the total allocation of PUIDs that are assigned into different ranges results in the subscriber unit being assigned a PUID that reflects the resource controller's operating state (non-failure/failure mode) and is unique within the scope of that resource controller's region.

If a native subscriber unit has already performed a unit registration with a first region of the communication system and then moves into a second region of the communication system in a failure mode, the native subscriber unit simply registers its PUID at the new location on the system by performing a location registration, retaining the PUID that it was originally assigned when it originally performed unit registration with the system. This is possible since the sites and subsystems within the communication system can uniquely determine the subscriber's SUID as there is a fixed relationship between the PUID and the native subscriber unit's UID.

When, however, a roaming subscriber unit moves into a second region of the communication system in a failure mode after performing unit registration with a first region of the communication system that is not in a failure mode, or when a roaming subscriber unit leaves a region that is in failure mode and moves into another failure region or a non-failure region, the resource controller in the second region of the communication system may need to assign a new PUID to the roaming subscriber unit in order to make the assigned PUID unique within the region that the subscriber is entering. To accomplish this, the resource controller for the region that the subscriber is entering detects that a roaming subscriber unit is attempting to register its location with a PUID that was assigned by a resource controller that was operating in a failure mode and requests that the roaming subscriber unit to perform a unit registration with the system using a unit registration command. The unit registration command is known in the art and will not be discussed in detail herein.

If a roaming subscriber unit has performed a unit registration with the communication system in a normal operating mode and been given a PUID in the range of 16,000,000 to 16,500,000, and then moves into a region in failure mode, the resource controller requests the roaming subscriber unit to perform a unit registration with the system. The roaming subscriber unit must perform a unit registration because when the subscriber registered its new location on the system, it only registered with the PUID that it was originally assigned. There is no fixed relationship between the roaming subscriber unit's SUID and the PUID and the resource controller in the region in failure mode requires knowledge of the mapping of the roaming subscriber unit's PUID to the SUID in order to process communication services. Therefore, the resource controller in the region in failure mode requests the roaming subscriber unit to perform a unit registration. When the subscriber unit responds with a unit registration request, it is assigned a new PUID from the range of 16,500,001-16,777,200, depending on the failure experienced in the region of the communication system. The new PUID is assigned to the roaming subscriber unit until normal operations are restored in the subsystem or the roaming subscriber moves out of the isolated subsystem.

For instance, when a roaming subscriber unit registers its SUID during unit registration on system 102, at site 118 if the sites within the RF subsystem 106 can communicate, but the RF subsystem 106 is in subsystem isolation, then the resource controller at the RF subsystem 106 assigns a new PUID of 16,500,001. This allows the resource controller in subsystem isolation to assign a unique number to a roaming subscriber unit, and also to differentiate between those roaming subscriber units that were present prior to subsystem isolation and those that have entered the subsystem subsequent to subsystem isolation.

Similarly, if the roaming subscriber unit enters a site in the communication system which is in site trunking and registers its SUID, the resource controller operating the site-trunked region assigns a new PUID of, for example, 16,750,001, which the roaming subscriber unit retains until the roaming subscriber unit leaves the site or the site recovers communication with the rest of the system. In other words, when a roaming subscriber unit moves into the coverage of a site that is in site trunking, the resource controller at the site requests that the subscriber unit perform a unit registration with the system, for example, via a unit registration command. The resource controller at the site uses this process to assign the roaming subscriber unit a new PUID from the site isolation range of 16,750,000 to 16,777,200. Thus, any resource controller can assign a PUID to any roaming subscriber unit to use when requesting communication services from the resource controller.

When the subsystem or site recovers from a failure situation, the resource controller requests that any roaming subscriber units with PUIDs that were assigned by the resource controller in the failure mode to perform unit registration. The resource controllers cannot guarantee that the PUIDs that were assigned during the failure situation, i.e., subsystem isolation or site trunking, remain unique when compared to the rest of the roaming subscriber units in the communication system. Therefore, unit registration is required to ensure that the resource controller can uniquely identify the roaming subscriber units requesting communication services with their PUIDs. Thus, when other resource controllers in the system detect a subscriber unit attempting to register its location or request a communication service with an assigned PUID from the reserved subsystem isolation range, the resource controller requests that the roaming subscriber unit perform unit registration.

If there were no mobility changes, i.e., none of the roaming subscriber units have entered or left the failure region while the failure is occurring, then none of the subscriber units need to perform unit registration when normal operating mode is re-established by the communication system; all of the subscriber units retain the same assigned PUID they received when they initially fully registered with the communication system, prior to the failure.

In short, regardless of where the roaming subscriber unit traveled from, if the resource controller of the communication system in which the subscriber unit travels to detects/determines that the roaming subscriber unit is assigned a PUID that is allocated from the reserved isolation range, then the resource controller requests that the roaming subscriber unit performs unit registration with the communication system. Utilizing the unit registration procedure results in the roaming subscriber unit being assigned a new PUID that reflects the new resource controller's state (failure/normal operating state) and is unique within the region of the system controlled by that resource controller. This is needed since the resource controller may already have assigned the PUID that the roaming subscriber unit was assigned by a second resource controller in a previous site or subsystem to another subscriber unit. When the subsystem recovers, the resource controller for the system learns about all of the roaming subscribers that registered at a subsystem while it was in subsystem isolation. Any subscriber units that are assigned a PUID, allocated from the pre-determined subsystem isolation range are then assigned new PUIDs. The resource controller for the system requests that the subscriber units perform unit registration one at a time, via a unit registration command. If there were no mobility changes while the subsystem is in isolation, then none of the subscriber units need to perform unit registration when communication is re-established with the rest of the system. Any subscriber unit that attempts to initiate a communication using a PUID that was allocated from the pre-determined subsystem isolation range is rejected by a resource controller that is not operating in subsystem isolation and immediately requested to perform unit registration.

The present disclosure also provides a method to assign temporary PGIDs for non-native subscriber groups in non-failure and failure regions of a communication system in a manner similar to the assignment of PUIDs to roaming subscriber units. Subscriber groups are associated with a communication system and are assigned an address or SGID corresponding to the communication system in which the subscriber group is formed. When a subscriber unit affiliates with the subscriber group, the subscriber unit affiliates with the subscriber group using its PUID and the subscriber group's SGID. Communication systems have various subscriber groups wherein the number and identity of the subscriber units affiliated with the various groups is dynamic. Subscriber units registered with a first system may affiliate with a subscriber group of the first system. In addition, subscriber units registered with a second system may also affiliate with a subscriber group of the first system, a "non-native" subscriber group to the second system. Thus, the subscriber unit registered in the second system need not "roam" into the first system to affiliate with a subscriber group of the first system. Allowing group communications between multiple communication systems is one of the keys to providing interoperable solutions. Furthermore, a subscriber unit may register with a non-native communication system and affiliate with a non-native subscriber group of that communication system. This would typically occur when a subscriber unit is roaming into another system that is providing coverage extension of the subscriber's home system, but the subscriber continues to operate on its original subscriber group that is also native to the subscriber's home system.

In order to receive wireless communication services from, for example, system 104, for a non-native subscriber group from, for example system 102, the subscriber unit requests to affiliate its PUID with a SGID with the resource controller of the region, in one example, RF subsystem 112. In steady state or normal operating mode, the non-native subscriber group is assigned a unique PGID by the resource controller for RF subsystem 112 while in RF subsystem 112. The PGID assigned is also valid in RF subsystems 114 and 116, provided that the subsystems 112, 114, and 116 are in normal operating mode and all the call elements necessary for communications are intact. If the communication system is in normal operating mode, the resource controller of RF subsystem 112 can relay all the necessary information to the communication system 104 such that any sites or subsystem within the communication system 104 are aware of the relationship of the PGID to a non-native subscriber group ID. Relaying the information not only allows the roaming subscriber unit to use the communication system resources, but it also ensures that the PGID is unique to each of the subscriber groups operating in the communication system 104.

Turning again to FIG. 1, when a subscriber unit, registered with RF system 104, wishes to affiliate with a subscriber group of RF system 102, the resource controller in RF system 104 that is allocating resources to the subscriber unit in RF system 104 recognizes that the subscriber group to which the subscriber unit wishes to affiliate is foreign, i.e., a non-native subscriber group of RF system 102. The resource controller for the RF system 104 assigns a PGID to the non-native subscriber group of RF system 102 in order for the resource controller(s) of RF system 104 to allocate resources to the subscriber units registered in RF system 104 that affiliate with the non-native subscriber group of RF system 102.

Subscriber groups are assigned PGIDs during failure and non-failure situations. When assigning a PGID to native subscriber groups of RF system 104, the RF system 104 assigns the GID of the SGID as the PGID of the subscriber group. Once the PGID is assigned, both native and non-native subscriber units registered with the RF system 104 are able to request group communications and receive notifications of group communications from the resource controller using the assigned PGID.

When assigning a PGID to a non-native subscriber group from RF system 102, the PGID is assigned by the resource controller of the RF system 104 in which the subscriber unit who wishes to affiliate with the non-native subscriber group is physically located. In FIG. 2B of the present disclosure, under normal, non-failure operating conditions, a non-native subscriber group from RF system 102 is assigned a unique PGID in the range of 64,000-65,000 by resource controller of RF system 104. For example, whenever a subscriber unit from RF system 104 affiliates with a non-native subscriber group from RF system 102, if there are no system failures in RF system 104, the resource controller of the RF system 104 in which the subscriber unit is physically located assigns the non-native subscriber group a PGID of 64,001. The resource controller of the RF system 104 to which the subscriber group is not native is then able to allocate resources to the subscriber unit to allow the subscriber unit to communicate with all of the other subscriber units affiliated with the subscriber group, no matter the location of the subscriber units. It is important that the PGID is unique in the system so that only the subscriber units affiliated with a particular subscriber group are included in the group communication. Furthermore, it is important that the same PGID is assigned to all of the subscribers affiliated with the same SGID in the system, so that all of the subscriber units affiliated with a subscriber group are included in the group communication.

Under failure conditions, however, the PGID assigned to a non-native subscriber group is restricted between 65,001-65,533. When the failure is subsystem isolation, the range of PGIDs assigned to non-native subscriber groups is between 65,001-65,300. When the site is in site trunking, the range of the PGIDs assigned to non-native subscriber groups is restricted between 65,301-65,533. For example, if RF subsystem 116 is in subsystem isolation, the resource controller for RF subsystem 116 assigns a non-native subscriber group a PGID of 65,001 so that the subscriber units within the region of RF subsystem 116 may have group communications with other members of the non-native subscriber group similarly located in RF subsystem 116. Similarly, if site 146 of RF system 104 is in site trunking, then the resource controller of site 146 assigns the non-native subscriber group from RF system 102 a PGID of 65,534 so that the subscriber units within the region of site 146 may have group communications with other members of the non-native subscriber group similarly located in site 146.

If there are no mobility changes, i.e., none of the non-native subscriber groups enter or leave the failure region while the failure is occurring, then none of the subscriber units affiliated with the non-native subscriber group need to re-affiliate when normal operating communication is re-established. The subscriber units and thus, the non-native subscriber group, retain the same PGIDs that they were assigned when they initially affiliated with the SGID with a resource controller of the communication system, prior to the failure.

If there are mobility changes, i.e., when subscriber units affiliated with a non-native subscriber group enter a failure region, the resource controller providing communication services to the subscriber units assigns a new PGID to the non-native subscriber group. By assigning a new PGID reflecting the operating state of the resource controller, the resource controller allows the subscriber units affiliated with the non-native subscriber group to continue to have group communications with one another inside the failure region, even if the subscriber units are not able to communicate with subscriber units affiliated with the subscriber group outside of the failure region.

The resource controller assigns a new PGID to the subscriber group by requesting each subscriber unit affiliated with the non-native subscriber group to re-affiliate with the non-native subscriber group. For example, the resource controller can request the subscriber units to perform full registration with the resource controller individually, as discussed above using the unit registration command since the full registration procedure includes affiliating with a subscriber group. The same occurs if the subscriber unit leaves a failure region or when the region recovers—the subscriber units are requested to re-affiliate to the group. When the subscriber unit affiliates with the non-native subscriber group, the resource controller assigns a PGID to the non-native subscriber group reflecting the operating state of the resource controller's region in order for the members of the subscriber group to communicate with one another in the coverage region of the resource controller, whether in failure mode or not.

When a subscriber unit affiliated with a non-native subscriber group leaves a failure region of a communication system, or when the subsystem or site recovers, and the resource controller begins to assign a new PGID to the non-native subscriber group, the above solution to the failure situation creates an issue where temporarily two PGIDs are assigned to different subscriber units of the same non-native subscriber group at the same time because each of the subscriber units in the subscriber group are requested to affiliate with the group one at a time. When the subscriber units affiliate with the group, the registering subscriber unit is assigned the new PGID. It is important to prevent any members of the non-native subscriber group from missing a group communication, which is possible as a group communication initiated from a subscriber which has re-affiliated with the group, would be transmitted using the new PGID. Any subscriber units affiliated with the non-native subscriber group that had not re-affiliated with the group would not be assigned the new PGID yet and would miss a group communication initiated on the new PGID. Conversely, any subscriber units affiliated with the non-native subscriber group that had re-affiliated with the group and were assigned the new PGID would miss a group communication initiated on the old PGID.

One solution to this issue would be for the resource controller to assign a new PGID to the subscriber group and send a new message over the RF interface (control channel) that would indicate the new SGID to PGID assignment to all the subscriber units affiliated with the non-native subscriber group. Any subscriber unit that sees the broadcast message on the control channel and is affiliated with the SGID would replace their current PGID assignment with the new PGID assignment. When not assigned to a traffic channel, a subscriber unit attempts to find a control channel. Thus, subscriber units affiliated with particular subscriber groups would, by protocol, be monitoring a control channel and a message over a control channel indicating the mapping of the SGID to the new PGID would be readily received.

Another alternative would be for the resource controller to "patch" the two PGIDs together by assigning two traffic channels to any group communication on the non-native subscriber group, while the subscriber units affiliated with the non-native subscriber group were re-affiliating with the subscriber group. The resource controller assigns a first traffic channel to the old PGID and assigns a second traffic channel to the new PGID. Subscriber units still assigned to the old PGID would listen to the group communication on the first traffic channel and subscriber units assigned to the new PGID would listen to the group communication on the second traffic channel. The resource controller would route all group communications between the first and second traffic channels, so that all subscribers units affiliated to the non-native subscriber group would receive the group communication. In addition, the resource controller of the system would replace any embedded link control information of the group communication from the first traffic channel that contained any information related to the old PGID with information related to the new PGID prior to sending the communication on the second traffic channel.

In one approach to accomplish this "patch", the resource controller would direct the first and second traffic channels to use the same multicast IP address for the communication on the non-native subscriber group when the traffic channels in the communication system were connected to an IP network.

The present disclosure is susceptible of embodiment in various forms, and the embodiment presented herein is to be considered an exemplification of the disclosure and is not intended to limit the invention to the specific embodiment illustrated.

It should be further understood that the title of this section of this specification, namely, "Detailed Description of The Disclosure", relates to a requirement of the United States Patent Office, and does not imply, nor should be inferred to limit the subject matter disclosed herein.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A method of assigning a provisional unit identification (PUID) to a subscriber unit in a wireless communications system, the wireless communication system comprising a plurality of resource controllers, the method comprising the steps of, at a resource controller:

knowing a plurality of predetermined ranges of PUIDs used by the plurality of resource controllers to assign to roaming subscriber units;

assigning a PUID to a roaming subscriber unit from a first predetermined range when an operating state of the resource controller is not experiencing a failure; and assigning a PUID to the roaming subscriber from a second predetermined range when the operating state of the resource controller is experiencing a failure.

2. The method of claim 1, wherein the resource controller assigns a new PUID from the first predetermined range to the roaming subscriber when the operating state of the resource controller changes from a failure state to a recovery state.

3. The method of claim 2 further comprising the steps of:

rejecting a communication from the roaming subscriber unit if the roaming subscriber unit attempts to initiate the communication using the PUID that was assigned by the resource controller during the failure state before the new PUID is assigned; and requesting the roaming subscriber unit to perform unit registration with the resource controller.

4. The method of claim 1, wherein the resource controller is one of a site controller and a zone controller.

5. The method of claim 1, wherein the failure experienced by the resource controller is one of zone isolation and site trunking.

6. A method of assigning a provisional unit identification (PUID) to a subscriber unit in a wireless communications system, the wireless communication system comprising a plurality of resource controllers, the method comprising the steps of, at a first resource controller:

knowing a plurality of predetermined ranges of PUIDs used by the plurality of resource controllers to assign to roaming subscriber units, wherein a second resource controller assigns a PUID to a roaming subscriber unit from a first predetermined range when an operating state of the second resource controller is not experiencing a failure, and wherein the second resource controller assigns a PUID to the roaming subscriber unit from a second predetermined range when the operating state of the second resource controller is experiencing a failure;

detecting that the roaming subscriber unit having a PUID assigned by the second resource controller has entered the region controlled by the first resource controller;

determining which predetermined range from which the PUID of the roaming subscriber unit was allocated; and requesting the roaming subscriber unit to perform unit registration with the first resource controller unless the predetermined range from which the PUID of the roaming subscriber unit was allocated was from the first predetermined range and a current state of the first resource controller is not experiencing a failure.

7. The method of claim 6, wherein the first or second resource controller is one of a site controller and a zone controller.

8. The method of claim 6, wherein the failure experienced by the first or second resource controller is one of zone isolation and site trunking.

9. A method of assigning a provisional group identification (PGID) to a subscriber group in a wireless communications system, the wireless communication system comprising a plurality of resource controllers, the method comprising the steps of, at a resource controller:

knowing a plurality of pre-determined ranges of PGIDs used by the plurality of resource controllers to assign to subscriber units affiliated with a non-native subscriber group;

assigning a first PGID to each subscriber unit affiliated with a non-native subscriber group from a first predetermined range when an operating state of the resource controller is not experiencing a failure; and assigning a second PGID to each subscriber unit affiliated with the same non-native subscriber group from a second predetermined range when the operating state of the resource controller is experiencing a failure.

10. The method of claim 9, wherein the resource controller is one of a site controller and a zone controller.

11. The method of claim 9, wherein the failure experienced by the resource controller is one of zone isolation and site trunking.

12. The method of claim 9, wherein the resource controller assigns a second PGID from the first predetermined range to each subscriber unit in the non-native subscriber group when the operating state of the resource controller changes from a failure state to a recovery state.

13. The method of claim 12, wherein the non-native subscriber group comprises subscriber units having a PGID from the first predetermined range and subscriber units having a PGID from the second predetermined range, and wherein the resource controller patches the plurality of PGIDs together by assigning a first traffic channel to the first PGID and assigning a second traffic channel to the second PGID, wherein the subscriber units assigned to the first PGID listen to a group communication on the first traffic channel and subscriber units assigned to the second PGID listen to the group communication on the second traffic channel, and the resource controller routes the group communication between the first and the second traffic channels so that all of the subscribers units affiliated with the non-native subscriber group receives the group communication.

14. The method of claim 12, wherein the resource controller assigns the second PGID by transmitting a communication on a control channel indicating a mapping of the non-native subscriber group to the second PGID.

15. The method of claim 14, wherein the communication instructs each subscriber unit affiliated with the non-native subscriber group to replace its PGID with the second PGID.

16. A method of assigning a provisional group identification (PGID) to a subscriber group in a wireless communications system, the wireless communication system comprising a plurality of resource controllers, the method comprising the steps of, at a first resource controller:

knowing a plurality of predetermined ranges of PGIDs used by the plurality of resource controllers to assign to subscriber units affiliated with a non-native subscriber group, wherein a second resource controller assigns a PGID to a non-native subscriber group from a first predetermined range when an operating state of the second resource controller is not experiencing a failure, and wherein the second resource controller assigns a PGID to the non-native subscriber group from a second predetermined range when the operating state of the second resource controller is experiencing a failure;

detecting that the non-native subscriber group having a PGID assigned by the second resource controller has entered the region controlled by the first resource controller;

determining which predetermined range from which the PGID of the non-native subscriber group was allocated; and requesting each subscriber unit affiliated with the non-native subscriber group to affiliate to the non-native subscriber group again unless the predetermined range, from which the PGID of the non-native subscriber group was allocated, was from the first predetermined range and a current state of the first resource controller is not experiencing a failure.

17. The method of claim 16, wherein the first or the second resource controller is one of a site controller and a zone controller.

18. The method of claim 16, wherein the failure experienced by the first or second resource controller is one of zone isolation and site trunking.

* * * * *